Figure 4:
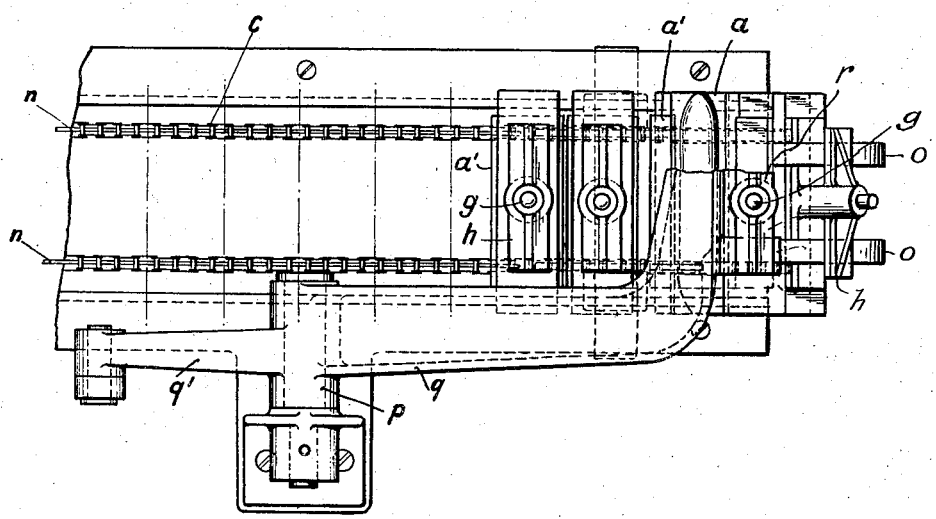

Dec. 13, 1938.  B. STELZER  2,140,093
CIGAR SHAPING MACHINE
Filed Oct. 31, 1936  2 Sheets-Sheet 1
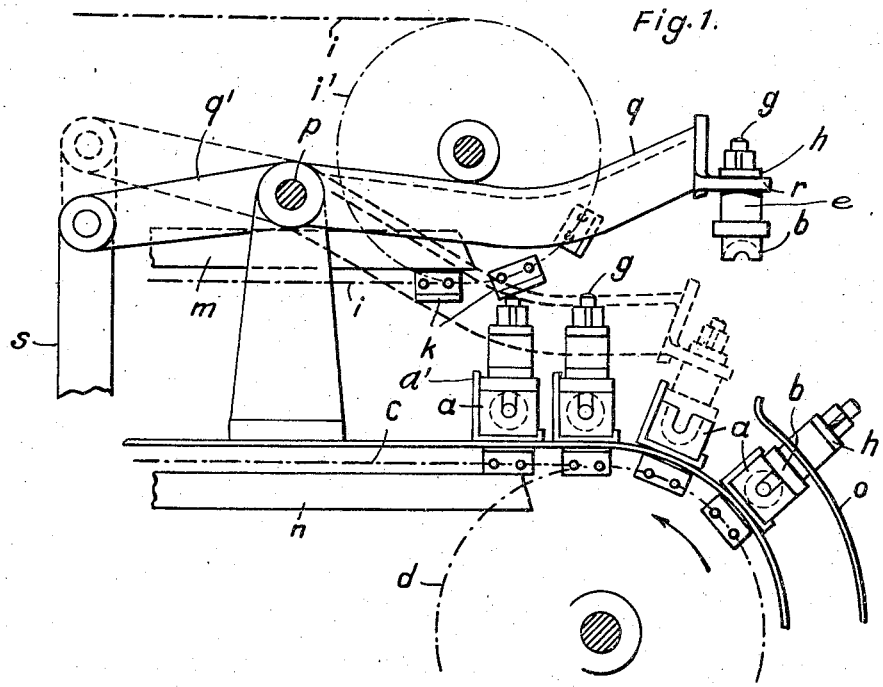
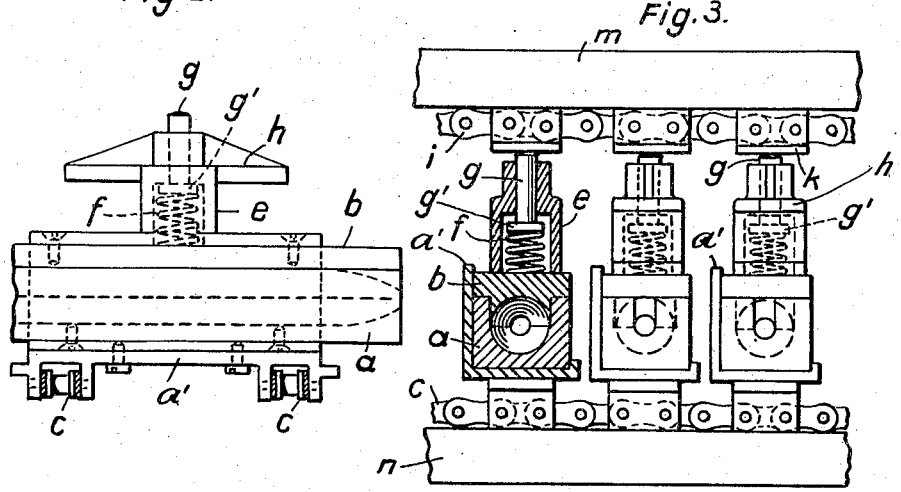
Inventor
Benno Stelzer
By Young, Emery + Thompson
Attorneys Dec. 13, 1938.　　　　B. STELZER　　　　2,140,093
CIGAR SHAPING MACHINE
Filed Oct. 31, 1936　　　2 Sheets-Sheet 2

Inventor:
Benno Stelzer

By Young, Emery + Thompson
Attorneys

Patented Dec. 13, 1938

2,140,093

UNITED STATES PATENT OFFICE 2,140,093

CIGAR SHAPING MACHINE

Benno Stelzer, Dresden, Germany, assignor to "Universelle" Cigarettenmaschinen - Fabrik J. C. Müller & Co., Dresden, Germany Application October 31, 1936, Serial No. 108,667
In Germany November 7, 1935

3 Claims. (Cl. 131—9)

It is already known to press and shape cigar fillers in molds, there being used preferably upper mold sections, and lower mold sections affixed to endless conveying devices arranged one above the other. The filler is placed into the lower mold section, then the upper mold section is placed thereon and pressed firmly against the lower mold section, so as to subject the filler to pressure, and the filler remains in this state until it arrives at the end of the conveying path where the upper mold part which constitutes a cover for the lower mold part is removed and the filler is taken out of said lower part.

The fillers do not have generally, prior to their being inserted into, and subjected to pressure within, the said mold, exactly the same shape, in consequence whereof the fillers are not uniformly pressed, that is to say, some are more or less loose and some more or less rigid.

These drawbacks are obviated by the present invention, in which the two mold parts are pressed against one another by the intermediary of an elastic member, for instance a spring, which is inserted between the mold and the means for pressing the mold parts against each other. The elastic member is of such strength that it is not only able to exert a sufficiently strong pressure on the filler, but it can yield when the permissible maximum pressure is surpassed.

The invention is illustrated diagramatically and by way of example on the accompanying drawings on which—

Figure 1 is a side view of the arrangement and combination of parts provided for attaining the purpose in view, Figure 2 is a separate view of one of the molds on an enlarged scale and taken in the direction from the left to the right of Fig. 1, Figure 3 is a vertical section through a number of consecutive molds on an enlarged scale, including a number of a portion of the machine of adjacent parts, Figure 4 is a plan view of Fig. 1.

Each mold consists in known manner of a lower part $a$ and an upper part $b$. The mold parts $a$ are attached by means of members $a'$ to endless chains $c$ running over chain-wheels $d$ of which only one is shown in dotted lines in Fig. 1. When a filler is inserted into a mold part $a$, the appertaining mold part $b$ is placed thereon. Each of these parts has an upwardly directed hollow extension $e$ in which a helical compression spring $f$ is housed. The lower end of the spring bears on the upper mold part, and the upper end of said spring contacts with the head $g^1$ of a short bolt $g$ sliding in a bore of the head portion of the extension $e$ and extending outwardly a little short distance above the top face of said head portion. At the upper end of each extension $e$ are lateral projections $h$ extending parallel to the molds.

An upper endless chain $i$ running over chain-wheels $i'$ (of which likewise only one is shown in dotted lines) is equipped with pressing members $k$ which are remote from one another similar to the bolts $g$ which are also remote from one another. The arrangement of said members $k$ relative to said bolts is such that each of them can contact with a bolt and depress it so as to exert thereby an elastic pressure upon the upper mold part by the intermediary of the spring $f$.

$m$ and $n$ are ledges guiding the molds and the pressing members $k$ and preventing the chains from sagging while the pressing procedure is being carried out.

While the molds are being moved from the lower portion of the chains $c$ over the chain-wheels $d$ to the upper portion of said chains, they are held in proper position by means of circularly curved guide ledges $o$.

Withdrawing the upper mold part $b$ from the lower mold part $a$ can be effected manually or mechanically. It has already been proposed to provide for that purpose levers which are moved along together with the upper chains $i$, but this arrangement necessitates the provision of a separate lever for every mold whereby the mechanism is rendered comparatively complicated.

In the present improved construction a lever-mechanism is provided for the purpose in view, this mechanism comprising a double-armed lever $q$, $q'$ supported on the axle $p$ and being rocked automatically from any suitable driving-device by the intermediary of a connecting rod $s$, the rocking motion being, of course, properly timed with respect to the step-wise movement of the chains with the molds. The free end of the lever-arm $q$ is bent so as to extend over the forms and the bent part is provided with two projections $r$ so that the end of the lever has a forklike form. This fork can be swung downwards into the path of the upper mold parts when these have left the guide ledges $o$, the position of the fork with respect to the next mold being such that the upper mold part enters into the fork and the lateral projections $h$ of the mold lie above and upon the fork, as indicated in dotted lines in Fig. 1. When the lever arm $q$ now rises, it lifts the upper mold part from the lower one, as shown in Fig. 1 in full lines. The pressed filler can now be removed from the lower mold part and another filler be placed into the empty part. The raised mold part can then be withdrawn manually from the fork $r$ and can likewise manually be placed back upon the lower mold.

When the freshly filled mold proceeds on its path it contacts with the pressing member $k$ which exerts the requisite pressure upon the filler, whereby existing irregularities in the shape of the filler are compensated. In some cases the upper mold part will not contact with the lower one, in other cases this will take place and the spring will not be compressed. But if the mold halves do not contact with one another owing to the large diameter of the filler, the spring will be compressed in correspondence with that diameter, it being understood that it must be strong enough to exert the requisite pressure upon the filler and shape it as desired.

I wish it to be understood that I do not limit myself to the constructional form illustrated solely by way of example, especially as regards the details of the molds, of the conveying device, and of the operating means therefor. Concerning especially the springs they may be arranged between the two parts of the mold or below the lower mold part, that is to say, they may be arranged between the molds and the endless chains $c$ or other conveying means, whereby the same effect will be attained, and furthermore the means for opening and closing the molds may be otherwise designed, also as regards actuating them mechanically or, perhaps, manually. Besides, instead of the forked member $r$ any other member may be used, for instance a pin engaging a bore in the extension $e$ of the upper mold part, it being always understood that the disconnection and the connection of the parts concerned must be carried out fully reliably.

Finally, instead of making use of springs in order to render the molds, or the upper mold parts, yieldable, other elastic or yieldable means, for instance a piece of rubber, may be employed, this piece being arranged either below the entire mold or between the two mold parts.

I claim:—

1. A cigar filler pressing and shaping device having a series of consecutive travelling individual molds for individual fillers each consisting of an upper and a lower part, comprising, in combination with said molds, means for pressing said mold parts against each other, and yielding members inserted into the path of that pressure, the upper parts of the molds being provided with hollow extensions housing said yielding members and with outwardly extending members for engaging said yielding members and pressure means respectively.

2. A cigar filler pressing and shaping device having a series of consecutive travelling individual molds for individual fillers each consisting of an upper and a lower part, comprising, in combination with said molds an endless conveying device to which said lower mold parts are attached, means for pressing said mold parts against each other, a second endless conveying device carrying said pressing means, the pressing means engaging the upper parts and pressing same upon the lower ones while the filled molds are being conveyed by means of said conveying devices, and yielding members inserted into the path of that pressure.

3. A cigar filler pressing and shaping device having a series of consecutive travelling individual molds for individual fillers each consisting of an upper and a lower part, comprising, in combination with said molds, means for pressing said mold parts against each other, and yielding members inserted into the path of that pressure, an endless conveying device to which said lower mold parts are attached, a second endless conveying device carrying pressing members engaging the upper parts and pressing same upon the lower ones while the filled molds are being conveyed by means of said conveying devices, and means for holding the upper part of each mold in contact with the lower one while being moved round on a certain part of their path.

BENNO STELZER.